United States Patent [19]

Fleischer

[11] 4,195,851

[45] Apr. 1, 1980

[54] SYSTEM FOR FORMING A FLUID-TIGHT SEAL

[76] Inventor: Henry Fleischer, 18 Notch Park Rd., Little Falls, N.J. 07424

[21] Appl. No.: 920,404

[22] Filed: Jun. 29, 1978

Related U.S. Application Data

[60] Division of Ser. No. 659,370, Feb. 19, 1976, Pat. No. 4,108,475, which is a division of Ser. No. 479,667, Jun. 17, 1974, abandoned, which is a continuation-in-part of Ser. No. 427,149, Dec. 21, 1973, abandoned.

[51] Int. Cl.² .......................... F16J 15/02; F16J 15/40
[52] U.S. Cl. ........................................ 277/27; 277/190
[58] Field of Search ...................... 277/3, 27, 476, 190, 277/191

[56] References Cited

U.S. PATENT DOCUMENTS

| | | | |
|---|---|---|---|
| 2,684,882 | 7/1954 | Fernandez | 277/190 |
| 3,442,515 | 5/1969 | Murauskas | 277/27 |
| 3,443,816 | 5/1969 | Saleri et al. | |
| 3,756,673 | 9/1973 | Strub | 277/27 |
| 4,032,159 | 6/1977 | Zitting | 277/190 |

*Primary Examiner*—Robert I. Smith

[57] ABSTRACT

A system for forming a fluid-tight seal is provided which may be employed in a meter apparatus, faucet apparatus, filter apparatus and the like. The system includes a first member and a second member adapted to be seated in the first member, fluid inlet members connected to either members, at least two annular gaskets concentrically disposed about the second member and adapted to be forced against the first and second member when the second member is seated in the first member, and fluid is allowed to flow into contact with the gaskets, to form a fluid-tight seal between the members.

3 Claims, 3 Drawing Figures

SYSTEM FOR FORMING A FLUID-TIGHT SEAL

REFERENCE TO OTHER APPLICATIONS

This application is a division of application Ser. No. 659,370 filed Feb. 19, 1976, now U.S. Pat. No. 4,108,475 which is a division of application Ser. No. 479,667, filed June 17, 1974, now abandoned, which is a continuation-in-part of application Ser. No. 427,149, filed Dec. 21, 1973, now abandoned.

FIELD OF THE INVENTION

The present invention relates to a system for forming a fluid-tight seal which system may be employed in metering apparatus, faucets, filter apparatus or other type apparatus wherein forming a fluid-tight seal is important.

BRIEF DESCRIPTION OF INVENTION

In accordance with the present invention, there is provided a system for forming a fluid-tight seal between a first member and a second member, which system includes a first member, a second member adapted to be seated in said first member, fluid inlet means connected to the first member or second member, at least two annular gasket members concentrically disposed about the second member between a portion of said first and second members, and adapted to be forced against the first and second members when the second member is seated in the first member, and fluid is allowed to flow into contact with the gasket members, to form a fluid-tight seal between said members.

DETAILED DESCRIPTION OF THE FIGURES AND PREFERRED EMBODIMENTS OF THE INVENTION

Figure 1:
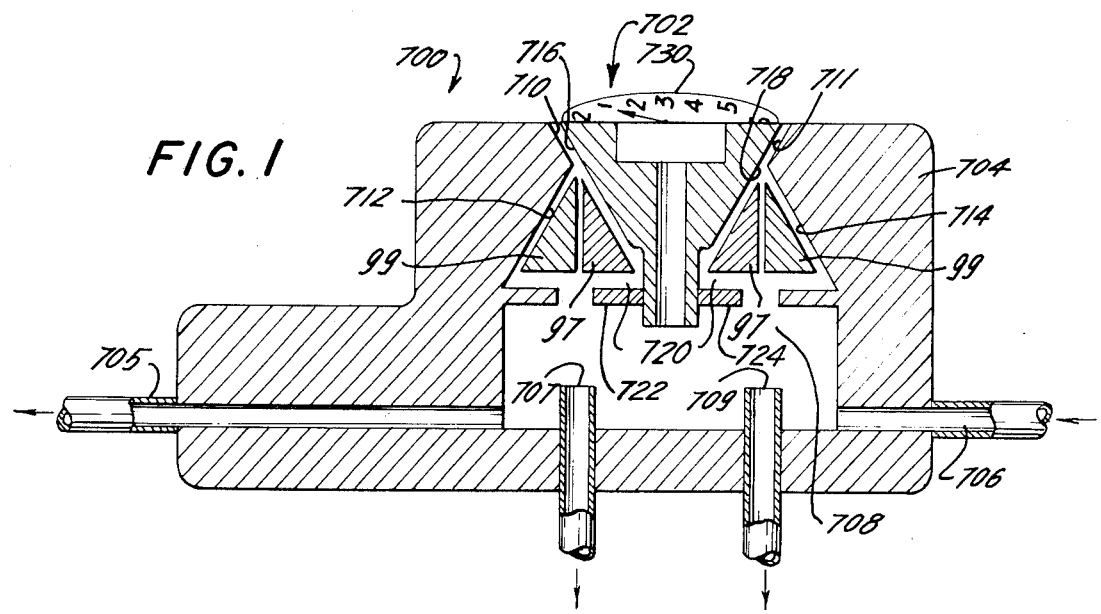
FIG. 1 is a schematic view of the system of the invention as employed in a meter device.

Referring now to FIG. 1, there is shown a system in accordance with the invention for forming a fluid-tight seal between two members; the system in one embodiment, as shown, comprises a meter apparatus, such as an air meter, generally indicated by the numeral 700. The meter apparatus 700 includes a meter portion 702 and a housing portion 704 and a pair of ring members or gaskets, 97, 99 for establishing a fluid-tight seal between the meter portion 702 and housing portion 704 in a manner as will be described below. The housing portion 704 includes an inlet flow passage 706 which opens into a cavity generally indicated by the numeral 708, and a drain outlet 705 and air hose connections 707 and 709 which are in communication with the cavity 708. The meter portion 702 is adapted to be seated in the cavity 708 and is supported by walls 710 and 711 of the body or housing portion 704, as shown.

The cavity 708 is defined in part by inclined walls 712 and 714 which together with the inclined walls 716 and 718 of the meter portion 702 define an annular chamber 720. The ring members 97, 99 are disposed in the annular chamber 720 about the meter portion 702, at least in part about the inclined surfaces 716 and 718, as shown. Support members 722 and 724 are connected to the housing portion 704 and the meter portion 702, respectively, and extend below the ring members 97, 99 as shown to ensure that such ring members are retained in the annular chamber 720. When the meter portion 702 is seated in the housing portion 704, fluid pressure acting on the rings 97, 99 cause the rings to form a fluid-tight seal between the inclined surfaces 716 and 718 of the meter portion 702 and the inclined surfaces 712, 714 of the body portion 704. The pressure of the fluid flowing into the cavity 708 via inlet flow passage 706, forces the rings to close or move up toward the face 730 of the meter portion 702, so that ring 99 is forced against the walls 712, 714 of the body portion 704 and ring 97 is forced against walls 716, 718 of the meter portion 702. The rings are formed of resilient material such as conventional gasket material. Accordingly, the surfaces of the rings will wear after repeated use. However, as the rings wear, they will automatically be adjusted in position and be moved, by fluid pressure, deeper into the chamber 720 and continue to form a fluid-tight joint between these members.

Figure 2:
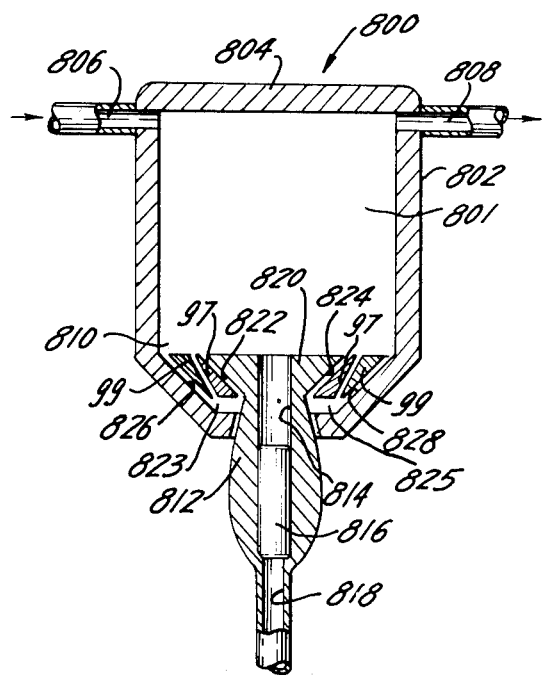
FIG. 2 is a schematic view of the system of the invention as employed in conjunction with a filter device.

Another application of the multiple ring or gasket member arrangement of the invention for use in a fluid flow line which includes a filter apparatus is shown in FIG. 2. The flow line and filter apparatus of FIG. 2 is indicated generally by the numeral 800 and includes a body portion 802, having a generally open interior or cavity 801, the upper end 804 of which includes fluid inlet means 806 and fluid outlet means 808. Seated in the lower portion 810 of the body portion 802 is member 812 having cavity 814 which communicates with the cavity 801 of the body portion 802. A filter element 816 is disposed in cavity 814, as shown, and includes outlet means 818.

The upper portion 820 of the member 812 and the lower portion 810 of the body portion define connecting annular chambers 823 and 825 which are specifically defined by inclined walls 822 and 824 of said member 812 and inclined walls 826 and 828 of the lower portion 810 of the body portion 802. Disposed within the annular chambers 823, 825 and about the upper portion 820 of the member 812, are ring members 97 and 99. When the member 812 including filter element 816 is seated in the body portion 802, fluid pressure acting on the rings 97, 99 cause the rings to form a fluid-tight seal between the inclined walls 822, 824 of the member 812 and the inclined walls 826, 828 of the body portion 802. The pressure of the fluid flowing into the inlet means 806 and cavity 801 forces the rings to close or move down toward the upper portion 820 of the member 812 so that ring 99 is forced against the walls 826, 828 of the body portion 802 and ring 97 is forced against walls 822, 824 of the member 812. The rings are formed of resilient material such as conventional gasket material. Accordingly, the surfaces of the rings will wear after repeated use. However, as the rings wear, they will be moved, by fluid pressure, deeper into the annular chamber 823, 825 and continue to form a fluid-tight joint between these members. Accordingly, fluid flowing into cavity 801 will flow only through filter element 816 and not between the body portion 802 and the member 812.

Figure 3:
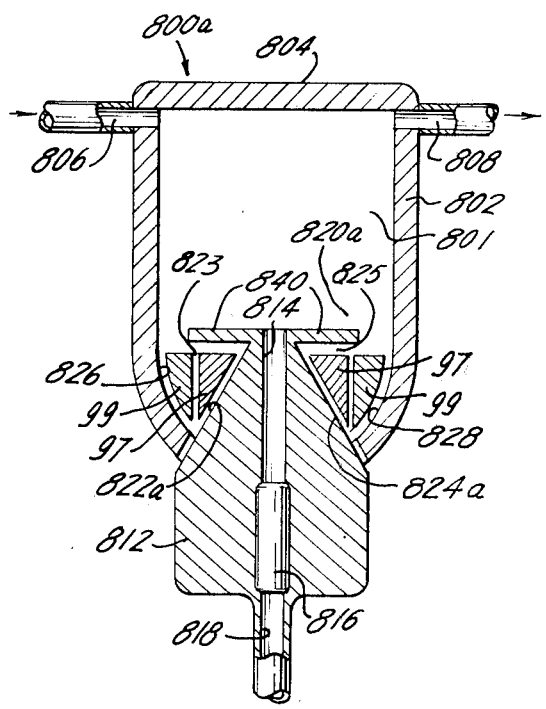
FIG. 3 is a schematic view of an alternate embodiment of the device shown in FIG. 2.

FIG. 3 shows another embodiment of a fluid flow linefilter apparatus 800a similar to that shown in FIG. 2. However, the upper portion 820a of the member 812 includes inclined walls 822a and 824a which are inclined toward each other, as shown, In addition, the upper portion 820a of the member 812 includes annular stop member 840 which prevents ring members 97, 99 from being pushed out of the annular chambers 823, 825 and member 812 from dropping out of body portion 802.

When the member 812 is seated in the body portion 802 as shown and fluid is allowed to flow into the inlet means 806 and cavity 801, the fluid acting against the ring members 97, 99 will cause such ring members to form a fluid-tight seal between the body portion 802 and the member 812, as in the embodiment shown in FIG. 2.

It will be appreciated that the system for forming a fluid-tight seal between two members, examples of which are shown in FIGS. 1, 2 and 3, may include two, three, four or more gaskets or ring members, which may be formed of any conventional gasket material. Furthermore, the gaskets or ring members, which contact the surfaces of the members, as shown, preferably include inclined surfaces which match and contact the inclined surfaces of the two members.

What is claimed is:

1. A system for forming a fluid-tight seal between a first member and a second member, comprising a first member including internal walls defining an inclined annular surface, and a second member including external walls defining an inclined annular surface, said second member being adapted to be seated and retained in said first member to provide a tapered annular chamber defined by said internal inclined annular surface of said first member and said external inclined annular surface of said second member, fluid inlet means connected to said first member or said second member, fluid outlet means connected to said first member or said second member, and at least two annular gasket members concentrically disposed about each other and said second member and positioned in said tapered annular chamber defined by the inclined annular surfaces of said first and second members, one of said gasket members including an inclined surface which substantially matches and is adapted to contact the inclined annular surface of said first member, and a second of said gasket members including an inclined surface which substantially matches and is adapted to contact the inclined annular surface of said second member, so that when said second member is seated in said first member and fluid is allowed to flow through said fluid inlet into contact with said gasket members, said gasket members are forced by fluid pressure into contact with each other and the walls of said tapered annular chamber to define a first position of said gasket members with respect to said tapered annular chamber and to thereby form a fluid-tight seal between the first member and the second member, and after surfaces of said gasket members wear, said gasket members are automatically adjusted in position and are moved by fluid pressure to a second position deeper into said tapered annular chamber so that said gasket members may continue to form a fluid-tight seal between said first member and said second member.

2. The system in accordance with claim 1 wherein said first member comprises a meter portion and said second member comprises a body portion or housing for said meter portion.

3. The system in accordance with claim 1 wherein said first member comprises a fluid flow line including a housing therefor and said second member comprises a filter assembly.

* * * * *